United States Patent [19]
Antonini

[11] 4,183,543
[45] Jan. 15, 1980

[54] HYDRODYNAMIC SEAL WITH COLLECTOR BEAD

[75] Inventor: Joseph Antonini, Chicago, Ill.

[73] Assignee: Dana Corporation, Toledo, Ohio

[21] Appl. No.: 959,632

[22] Filed: Nov. 13, 1978

[51] Int. Cl.² ............................................. F16J 15/32
[52] U.S. Cl. .................................................. 277/134
[58] Field of Search ............................ 277/1, 133, 134

[56] References Cited
U.S. PATENT DOCUMENTS

| | | | |
|---|---|---|---|
| 3,504,920 | 4/1970 | Halliday | 277/134 |
| 3,633,927 | 1/1972 | Van Deven | 277/134 |
| 4,084,826 | 4/1978 | Vossieck et al. | 277/134 |
| 4,118,856 | 10/1978 | Bainard et al. | 277/134 |

*Primary Examiner*—Robert I. Smith
*Attorney, Agent, or Firm*—Emch, Schaffer, Schaub & Todd Co.

[57] ABSTRACT

An improved liquid to gas seal is disclosed for a bi-directional rotatable shaft. The seal is of the annular lip type and has a circular sealing edge which engages the shaft. The gas side of the seal is provided with an annular bead parallel to and spaced from the sealing edge and with a plurality of asymmetrical ribs which efficiently pump liquid escaping past the sealing edge back to the liquid side of the seal.

4 Claims, 4 Drawing Figures

HYDRODYNAMIC SEAL WITH COLLECTOR BEAD

This invention relates to fluid seals for use between two relatively movable members and more particularly to an improved liquid to gas seal for bi-directional rotatable shafts.

Annular lip seals are commonly used for engaging rotatable shafts. The seals are used, for example, for retaining a liquid in a desired area, such as for retaining a lubricant within a reservoir or adjacent a bearing. Vehicles are often provided with a number of seals of this type. For example, annular lip seals are provided for sealing the main crank shaft to the engine block to prevent escapment of lubricating oil from the engine sump. Similarly, annular lip seals are provided on input and output shafts to the engine transmission and to an input shaft to the differential gear. In vehicles having rigid rear axle shafts connected for driving rear wheels, annular lip seals are further provided on the axle shafts to prevent leakage of lubricant from the differential gear housing. Annular lip seals of this type are provided with a circular sealing edge which resiliently engages the shaft as the shaft rotates. However, due to abrasion and loss of resilience over a period of time, some leakage may take place at the sealing edge which engages the shaft.

Prior art annular lip seals have been designed to provide a pumping action for returning or forcing leaking liquids past the sealing surface back to the liquid side of the seal. Such a seal, which is sometimes referred to as a hydrodynamic seal, is best exemplified in U.S. Pat. No. 3,923,315. The seal shown in this patent is provided with inwardly converging liquid and gas contacting surfaces which form a circular sealing surface for engagement with a rotatable shaft. An annular pressure bead is formed in the gas contacting surface to extend parallel to the sealing edge. A series of ribs are formed in a zig zag pattern in the gas contacting surface to extend between the pressure bead and the sealing edge. A catchment groove is formed in the gas contacting surface along the pressure bead to extend from rib to rib. In operation, lubricant or other liquid escaping past the sealing edge flows to the catchment groove and thence along one of the ribs where it is forced back to the liquid side of the seal. However, the ribs and the pressure bead shown in this patent are provided with a generally circular cross section which limits the efficiency of the ribs in pumping the liquid back to the liquid side of the seal.

According to the present invention, an improved hydrodynamic seal is provided with a zig zag pattern of asymmetrical ribs for efficiently pumping liquid escaping through the seal from a gas side of the seal back to a liquid side of the seal. The seal generally includes a liquid contacting surface and a gas contacting surface which converge inwardly to a sealing edge which engages either a unidirectional or a bi-directional rotatable shaft. A generally inwardly directed annular bead is formed in the gas contacting surface parallel to and spaced from the sealing edge. Ribs are formed in the gas contacting surface between the annular bead and the sealing edge to extend in a generally zig zag pattern. Alternate ones of the ribs extend parallel and are in the form of segments of substantially a conical helix. The ribs have a height from the gas contacting surface which is less than the height of the annular bead. Furthermore, the ribs are provided with an asymmetrical triangular cross section. The side of each rib directed toward the sealing edge extends at an angle of from 45° to 80° to the gas contacting surface and the side of each rib directed toward the annular bead extends at an angle of from 15° to 40° to the gas contacting surface. This asymmetrical cross section greatly increases the efficiency of the seal in pumping liquid escaping through the seal back to the liquid side of the seal.

Accordingly it is an object of the invention to provide an improved more efficient hydrodynamic seal for unidirectional and bi-directional rotatable shafts.

Other objects and advantages of the invention will become apparent from the following detailed description, with reference being made to the accompanying drawings.

Figure 1:
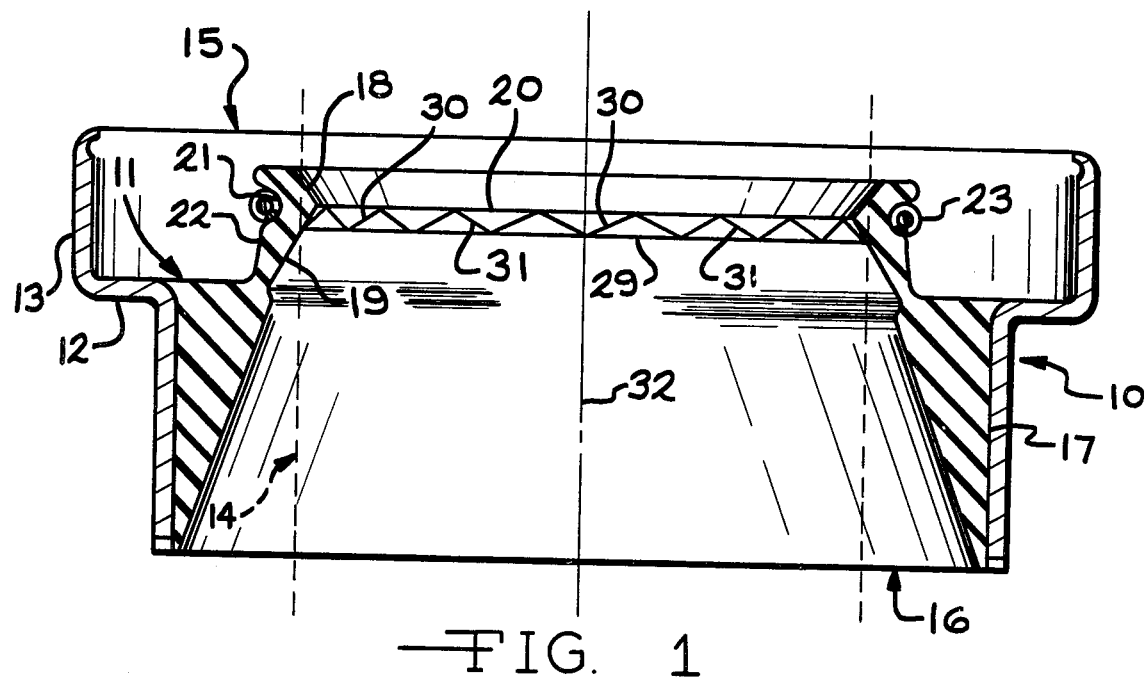
FIG. 1 is a cross sectional view through an annular hydrodynamic seal constructed in accordance with a preferred embodiment of the invention.
Figure 4:
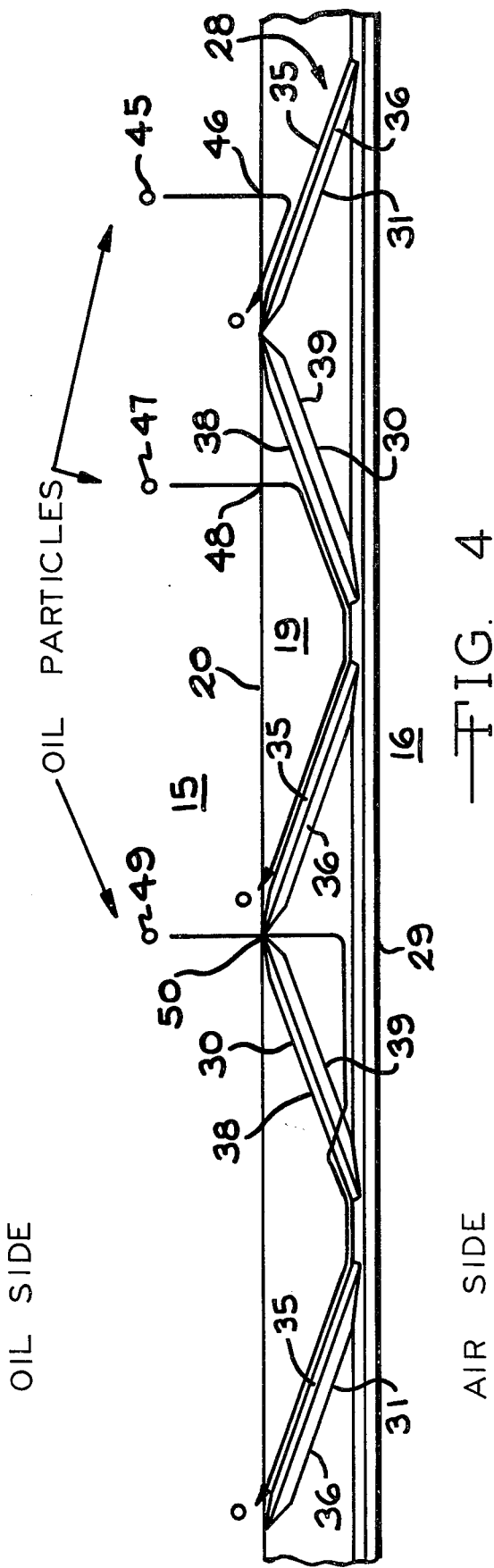

FIG. 4 is an enlarged fragmentary view showing the manner in which the rib causes escaping fluid to pump back to the liquid side of the seal Turning now to the drawings and particularly to FIG. 1, an annular lip seal 10 constructed in accordance with the present invention is shown in cross section. The seal 10 generally comprises an annular body of resilient material 11 mounted within a stepped tubular case 12 formed from metal or other rigid material. The case 12 is provided with an outer surface 13 which closely engages the seals to a bore (not shown) through which a driven shaft 14 extends coaxially. A side 15 of the seal 10 is exposed to liquid, such as a lubricating oil while a side 16 of the seal 10 is normally exposed to gas, such as air during normal use of the seal 10. The resilient material 11 is molded directly into the case 12 to form a fluid impervious interface 17 between the resilient material 11 and the case 12.

The resilient material 11 is shaped to define a liquid contacting surface 18 and a gas contacting surface 19. The surfaces 18 and 19 are generally conical in form and converge inwardly to form a circular sealing edge 20. The sealing edge 20 normally has a diameter smaller than the diameter of the rotatable shaft 14 and is deformed into resilient engagement with the shaft 14. A groove 21 is formed in an outer surface 22 of the resilient material 11 such that the groove 21 is spaced radially outwardly from the sealing edge 20. A helical tension spring 23 is positioned under tension within the groove 21. The spring 23 increases the resiliency through which the sealing edge 20 engages the shaft 14 to enhance the fluid tight seal at the interface between the resilient material 11 and the shaft 14.

Figure 2:
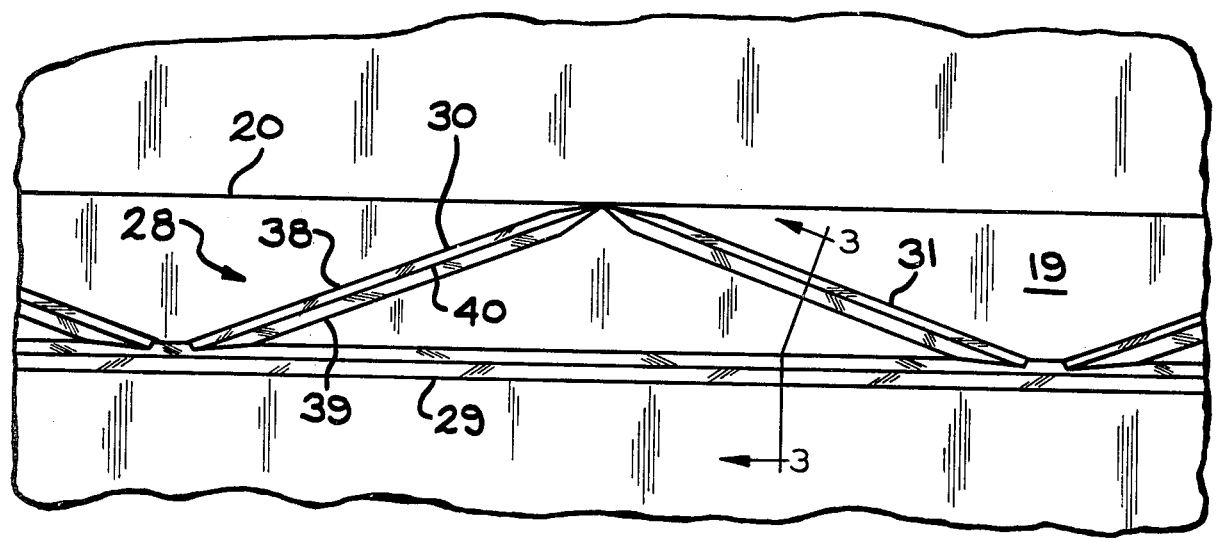
FIG. 2 is an enlarged fragmentary view showing details of the rib pattern on the gas contacting side of the seal adjacent the sealing edge.
Figure 3:
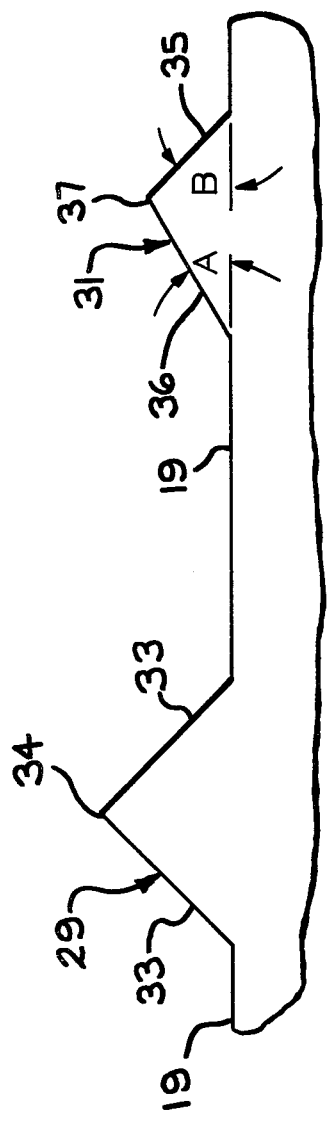
FIG. 3 is an enlarged cross sectional view taken along line 3—3 of FIG. 2.

According to the present invention, a novel rib structure 28 is formed integrally on the gas contacting surface 19 for pumping any liquid leaking from the liquid side 15 of the seal 10 past the sealing edge 20 back to the liquid side 15. The rib structure 28 generally comprises an annular bead 29 which is parallel to and spaced from the sealing edge 20, a first group of parallel ribs 30 and a second group of parallel ribs 31, as best seen in FIGS. 1-3. The ribs 30 are best described as defining segments of substantially a conical helix and extend parallel to one another in a predetermined direction about an axis 32 for the shaft 14 and the seal 10. Similarly, the ribs 31 are in the form of segments of substantially a conical helix and extend parallel to one another and in the opposite direction about the axis 32.

The circular bead 29 acts as a collector or barrier bead for limiting the distance in which oil escaping past the sealing edge 20 flows down the gas contacting surface 19. The circular bead 29 is generally triangular in cross section, as best seen in FIG. 3, and may have sides formed at an angle of 45° to the gas contacting surface 19 for examples. Sides 33 of the rib 29 converge to an apex 34 which has a predetermined spacing from the gas contacing surface 19.

The ribs 30 and 31 are asymmetrically triangular in cross section, as best illustrated in FIG. 3 which shows a sectional view through a rib 31. The rib 31 has a side 35 which is directed generally toward the sealing edge 20 and a side 36 which is directed generally toward the bead 29. The sides 35 and 36 converge to an apex 37 which is spaced from the gas contacting surface 19. The side 36 forms an angle "A" of from 15° to 40° to the surface 19 and the side 35 forms an angle "B" of from 45° to 80° to the gas contacting surface 19 to form an asymmetrical cross section. A cross section through each of the ribs 30 is identical to the illustrated cross section through the rib 31. Each of the ribs 30 includes a side 38 directed generally toward the sealing edge 20 and a side 39 directed generally toward the annular bead 29. The sides 38 and 39 converge to an apex 40. It should be noted that the ribs 30 and 31 are at a lesser height above the surface 19 then the annular bead 29. For example, if the annular bead 29 has a height on the order of 0.005 inch above the surface 19, then the ribs 30 and 31 may be on the order of 0.003 inch. It will be noted from FIG. 2 that the adjacent ribs 30 and 31 converge together to a point at the sealing edge 20. At the annular bead 29, the adjacent ribs 30 and 31 either may abut or may be slightly spaced apart, as illustrated in FIG. 2.

Turning now to FIG. 4, operation of the rib structure 28 for pumping oil or other liquid leaking past the sealing edge 20 back to the oil side 15 of the seal 10 is illustrated. In this illustration, it will be appreciated that the rib structure 28 is fixed, as is the entire seal 10. It will be assumed that the shaft is rotating in a direction such that the surface of the shaft moves from right to left across the rib structure 28 and, as a consequence, tends to move liquid particles from right to left along the rib structure 28. First, it will be assumed that a particle of oil or other liquid 45 escapes past the sealing edge 20 at a point 46 and flows in a generally axial direction until it contacts a rib 31. The rotating shaft will then tend to move the particle 45 from right to left along the relatively steep working surface 35 of the rib 31. This surface converges toward the sealing edge 20. As a consequence, the particle 45 is forced to flow in a generally helical direction towards the sealing edge 20 and will be forced back over the sealing edge 20 towards the liquid side 15 of the seal 10.

In a second illustration, a particle of liquid 47, such as a lubricating oil, crosses the sealing edge 20 at a point 48. As the particle 47 moves in a generally axial direction, it contacts the relatively steep surface 38 of a non-working rib 30. The particle 47 will then slide down the rib 30 until it contacts the next working rib 31. It then follows the same path along the steep side 35 of the working ribs 31 until it is forced over the sealing edge 20 back to the liquid side 15 of the seal 10.

In a third illustrated example, a particle 49 of oil or other liquid crosses the sealing edge 20 at a point between two adjacent ribs 30 and 31. The particle 49 continues downwardly until it reaches the annular bead 29 which prevents it from sliding further down the side of the seal 10. The particle 49 will gradually move to the left due to the rotational effect of the shaft. The particle 49 will move to the left along the bead 29 until it contacts and climbs over a non-working rib 30. The particle will climb over the rib 30 rather than the bead 29 since the rib 30 has less height than the bead 29. Furthermore, in accordance with the present invention, the particle 49 is helped in climbing over the bead 30 due to the shallower angle of the side 39 of the rib 30 which faces the bead 29. After the particle 49 climbs over the rib 30, it continues in a generally helical path along the steeper side 35 of the working rib 41 until it converges with and crosses the sealing edge 20.

It should be appeciated that the rib structure 28 will have an equal effect on pumping liquid escaping past a sealing edge back to a liquid side 15 of the seal 10 when the shaft is rotated in either a clockwise or counter clockwise direction. In one direction of rotation, the ribs 31 are working ribs for pumping the liquid past the sealing edge 20. In an opposite direction of rotation, the ribs 31 are non-working and the ribs 30 become the working ribs for pumping the liquid particles over the sealing edge 20 to the liquid side 15 of the seal 10. Since both the ribs 30 and the ribs 31 are asymmetrical in cross section, the sides 35 and 38 having the steeper angle with respect to the seal surface 19 are effective to limit the amount of liquid crossing the working rib 30 or 31. Furthermore, since the sides 39 and 36 of the ribs 30 and 31, respectively, which face the annular bead 29 are relatively shallow, the liquid is more easily moved over the back side of the non-working rib and into contact with the working rib. As a consequence, the rib structure 28 is far more efficient than prior art seals for pumping escaping liquid back to the liquid side of the seal.

It will be appreciated that various modifications and changes may be made in the above described preferred embodiment of the annular lip seal 10 without departing from the spirit and the scope of the following claims.

The embodiments of the invention in which an exclusive propertly or privilege is claimed are defined as follows:

1. A liquid to gas seal for a rotatable shaft having an axis comprising an annular body of resilient material defining an annular liquid contacting surface and an annular gas contacting surface, said surfaces converging inwardly to form a circular sealing edge for engagement with the shaft, an annular bead projecting inwardly from said gas contacting surface a predetermined distance, and a plurality of spaced ribs projecting inwardly from said gas contacting surface a distance less than said predetermined distance and extending between said annular bead and said sealing edge, said ribs defining segments of substantially a conical helix, alternate ones of said ribs defining a first group of parallel ribs and the remaining alternate ribs defining a second group of parallel ribs, said first group of ribs extending in an equal and opposite angular direction to said second group of ribs with respect to the shaft axis, each of said ribs having a side toward said sealing edge forming a first angle to said gas contacting surface and having a side toward said bead forming a second and smaller angle to said gas contacting surface.

2. The liquid to gas seal of claim 1, wherein the sides of said asymetrical ribs toward said sealing edge form an angle of from 45° to 80° to said gas contacting surface and the sides of said asymetrical ribs toward said annular bead form an angle of from 15° to 40° to said gas contacting surfact.

3. The liquid to gas seal of claim 2, wherein said rib sides toward said sealing edge form an angle of substantially 45° to said gas contacting surface and said rib sides toward said annular bead form an angle of substantially 30° to said gas contacting surface.

4. The liquid to gas seal of claim 2, wherein said annular bead is triangular in cross section.

* * * * *